United States Patent [19]

Gunther

[11] 4,250,600
[45] Feb. 17, 1981

[54] SLOTTED FASTENER

[75] Inventor: Conrad J. Gunther, Uniondale, N.Y.

[73] Assignee: Dzus Fastener Co., Inc., West Islip, N.Y.

[21] Appl. No.: 964,451

[22] Filed: Nov. 29, 1978

[51] Int. Cl.³ .............................................. A44B 17/00
[52] U.S. Cl. .................................. 24/221 A; 411/350; 411/411
[58] Field of Search ........... 85/5 P; 24/221 A, 221 K, 24/221 R

[56] References Cited

U.S. PATENT DOCUMENTS

| Re. 26,703 | 11/1969 | McCarthy | 24/221 R X |
|---|---|---|---|
| 2,474,799 | 6/1949 | Dzus | 24/221 A |
| 3,488,815 | 1/1970 | Metz | 24/221 K X |
| 3,898,716 | 8/1975 | Aylott | 24/221 K |
| 4,067,090 | 1/1978 | Schenk | 24/221 K |

Primary Examiner—Ramon S. Britts
Attorney, Agent, or Firm—Kane, Dalsimer, Kane, Sullivan & Kurucz

[57] ABSTRACT

A fastener including an enlarged head portion and a reduced diameter shank portion extending from one end of the head portion. A cam slot is formed in the end of the shank distal from the head portion. The cam slot has a spiral configuration and the entrance end of the full width of the slot is widened to facilitate coupling and uncoupling of the fastener with a cam follower introduced to the cam slot for forming a fastener assembly.

1 Claim, 7 Drawing Figures

SLOTTED FASTENER

BACKGROUND OF THE INVENTION

One common type of annoyance in handling many different types of fasteners is the difficulty in assembling parts of fasteners together. A similar annoyance occurs when the parts are disassembled and they interfere with one another as they are separated, commonly known as "hang up".

One type of fastener well known in the art is commonly called a quarter turn fastener. In this type of structure a slotted stud is coupled with a receptacle having a cam follower for mating with the cam slot in the stud. The quarter turn rotation between the stud and receptacle once the cam follower and slot are aligned will shift the assembly between the opened and closed positions. These fasteners are used in mass numbers in environments such as the aircraft industry, for example, on large structures such as supersonic airplanes. One of the features of the quarter turn fastener is ease of assembly and disassembly. This enables one to gain access to enclosures in a rapid and efficient manner. Thus, a problem such as "hang up" or difficulty of reassembly of components is a concern with quarter turn fasteners where fastener assemblies are often open and closed. Also, with mass numbers of fasteners being employed, the ease of assembly saves time and cost.

Consequently, an improved structure which assists in assembling fasteners and which avoids the problem of "hang up" between parts as they are disassembled would be extremely valuable to the known fastener environment. This is particularly true in the quarter turn fastener art where fasteners are often opened and closed and used in mass numbers.

SUMMARY OF THE INVENTION

With the above background in mind, it is among the primary objectives of the present invention to provide a fastener, particularly of the quarter turn type which facilitates coupling and uncoupling with a conventional type of receptacle. Ease of mating of components is facilitated as well as disassembly of parts so that "hang up" is avoided between the fastener and the receptacle.

It is an objective to provide a fastener of the quarter turn type with a slot formed in the end of the fastener of the spiral configuration and terminating in a locking detent. The leading edge of the slot is widened, preferably along its full width, to facilitate coupling of the slot with a conventional cam follower mounted in a receptacle so that the cam follower easily enters the slot for rotation of the fastener into the locking position with a quarter turn rotation relative to the receptacle so that the follower travels into the locking detent at the end of the slot.

It is contemplated that the widened end of the slot can be formed by relieving the end in a manner such as by back milling the slot after it has been formed so that a portion is cut at the leading open end of the slot angled outward from the surface of the slot forming the normal radius of curvature. Naturally other means of forming the widened end can be readily envisioned. The object is to relieve the slot at an outward for a short distance along its length at the entry end providing for a wider opening for introduction of the cam follower and avoiding the presence of sharp edges interfering with introduction of the cam follower into the slot.

It is contemplated that the fastener with the back milled end portion forming a widened opening also avoids the problem of "hang up" as the fastener is rotated to the open position with the cam follower travelling from the locking detent to the end of the stud. The widened end of the slot avoids interference or "hang up" between the slot and the cam follower and the fastener is easily separated from the receptacle.

In one successful form, a pair of opposing complementing helical slots are formed on the surface of the fastener shank. The pair of slots are positioned to mate with diametrically opposed inwardly extending cam follower tabs in a conventional receptacle.

A conventional way of constructing the fastener is to cut each slot by a milling process and then back milling to cut the relieved widened end portion. Each slot is cut along a conventional helix and it has been found effective to relieve each slot for approximately 30 degrees from the open initial end of the slot.

It is also an objective to facilitate introduction and removal of the fastener to provide the fastener end with an inward chamfer around the peripheral portion of its entire leading tip. This facilitates introduction of the fastener into the conventional receptacle and also avoids the presence of sharp edges at the end for alleviating the danger of "hang up". Thus, a chamfer cooperates with the relieved back milled end portion of the slot to avoid any interfering surfaces so that the cam follower and the receptacle can be quickly and efficiently disassembled from the fastener.

In summary, a slotted fastener is provided which includes an enlarged head portion and a reduced diameter shank portion extending from one side of the head. A cam slot is formed in the end of the shank distal from the head. The cam slot has a spiral configuration. The end portion of the slot is widened to facilitate coupling and uncoupling of the fastener with a cam follower introduced to the cam slot for forming a fastener assembly.

With the above-objectives among others in mind, reference is made to the attached drawings.

DETAILED DESCRIPTION

Figure 1:
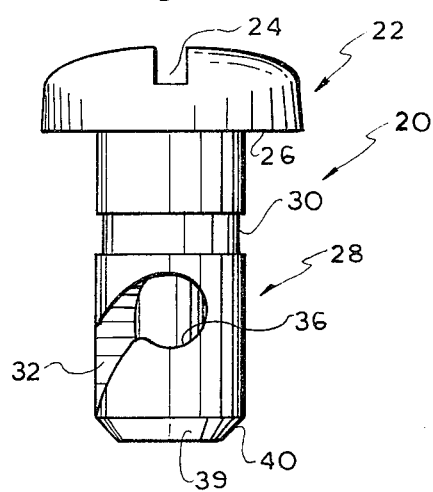
FIG. 1 is a side elevation view of the fastener of the invention.
Figure 2:
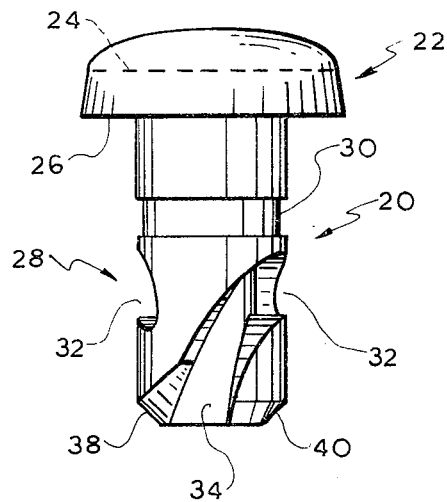
FIG. 2 is a side elevation view thereof from a direction at 90 degrees to the direction of FIG. 1.
Figure 3:
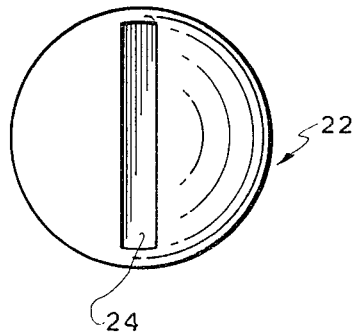
FIG. 3 is a top plan view thereof.
Figure 4:
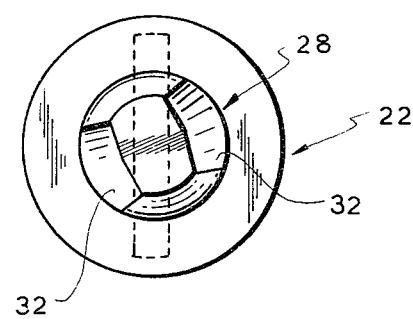
FIG. 4 is a bottom plan view thereof.

Fastener 20, shown independent of a receptacle in FIGS. 1-4, includes an enlarged head 22 with a slot in its upper surface 24 for insertion of a tool to rotate the fastener between the lock and unlocked positions. Extending from the underside 26 of the enlarged head 22 is a reduced diameter shank 28. Intermediate the ends of the shank and the depicted embodiment is a groove 30 for facilitating the mounting of the fastener in a conventional type of panel arrangement for use.

The end portion of the shank 28 distal from the head 22 includes a pair of opposing spiral cam slots 32. Each slot 32 is cut from the leading edge 34 of the shank and extends along the shank towards the head and terminates in a locking detent 36.

In common manufacturing procedures it is usually found effective to cut each slot 32 by a common type of milling process, particularly when the material for the fastener is a hard rigid material such as zinc plated steel. Normally each slot 32 would be cut with a constant diameter until the point of the locking detent 36 is reached at which time the depression is cut for seating of the cam follower. However, in the present invention the leading edge portion of each slot 32 is widened along its full width to facilitate entrance and removal of a cam follower and avoid difficulty in assembly and the danger of "hand up" between parts when the fastener is removed from its receiving receptacle. An effective way to provide the widened portion is to back mill each slot 32 in its leading end portion to form a widened zone 38. It has been found effective for a common size fastener to back mill each slot for approximately 30 degrees from the leading edge. This forms zone 38 extending outward from the normal radius of curvature of the surface forming the slot.

Another feature of the leading tip of the fastener 20 which facilitates introduction of the fastener to a receptacle and helps to avoid "hang up" as the fastener is removed is the presence of a beveled or chamfered end portion 40. Chamfered end portion 40 and widened back milled or relieved leading end portion 38 of each slot 32 cooperate to facilitate introduction of the fastener and avoid "hang up" of the fastener and receptacle when they are separated.

Figure 5:
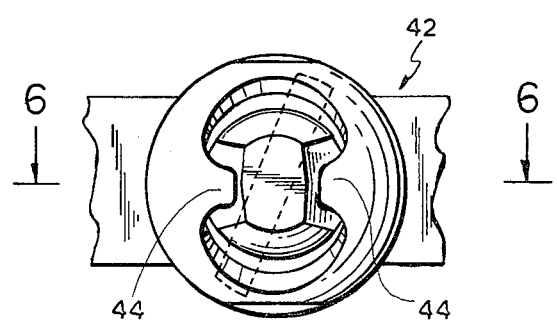
FIG. 5 is a bottom plan view of the fastener in position for introduction to a fragmentary portion of a receptacle.
Figure 6:
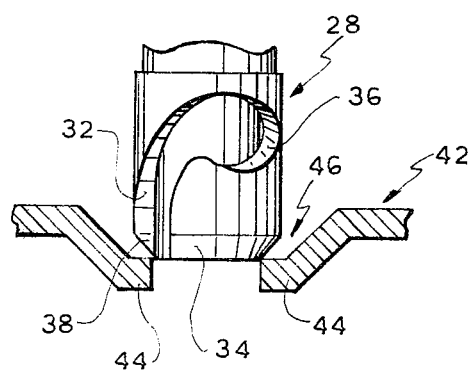
FIG. 6 is a sectional view thereof taken along the plane of line 6—6 of FIG. 5.
Figure 7:
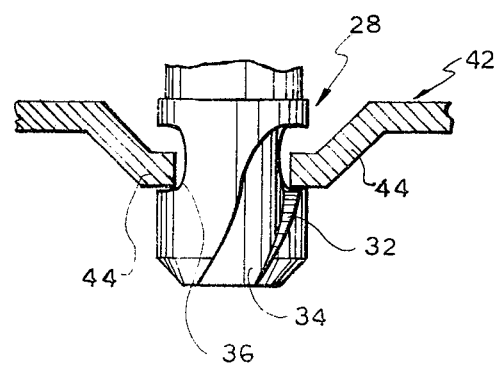
FIG. 7 is a sectional elevation view thereof showing the elements of FIGS. 5 and 6 with the fastener coupled with a receptacle.

FIGS. 5-7 show the assembling procedure for fastener 20 with a conventional type of receptacle 42. Only the operative portion of the receptacle is shown in the drawing. The receptacle is the conventional type of tubular receiving housing for the tubular shank 28 of the fastener and has diametrically opposed inwardly extending cam followers 44 in the form of a pair of tabs directed across the housing. Thus, as the fastener is introduced through the upper open end 46 of the receptacle it comes into contact with the cam follower tabs 44 which can be aligned with the entrance to slots 32 by initial rotation of the fastener 20 to reach the proper position. An appropriate tool such as a screwdriver is introduced into slot 24 in head 22 of the fastener and the fastener is rotated the approximate ¼ turn to cause cam followers 44 to travel axially along the respective spiral slots 32 until they seat in respective locking detents 36. Appropriate spring action is provided in the receptacle or on the stud (not shown) for accommodating the relative axial movement of the cam follower and the stud in travelling to the locking position.

Disassembly is accomplished in a similar quick and efficient manner by introducing a screwdriver into slot 24 and rotating the fastener 20 in the opposite direction with respect to the receptacle so that cam followers 44 are displaced from locking detents 36 and travel axially along slots 32 until they are free of the slots at which time the fastener can be withdrawn from opening 46 in the tubular housing of the receptacle permitting quick disassembly of the elements. A quarter turn is all that is required for disassembly similar to the assembling procedure.

To facilitate introduction of fastener 20 into the tubular receiving housing of the receptacle the beveled forward end 40 forms an effective leading portion to avoid any interference with the surrounding edges of the rim of the receptacle. Similarly, when the fastener reaches the cam followers 44, the widened or relieved back milled end portion 38 of each slot provides a wider opening for properly and easily locating each tab 44 in the entrance to a slot. The chances of interference between the tab and sharp edges at the entrance to the slot is minimized.

Similarly, when the fastener is disassembled, the absence of sharp edges at the end of the slots with the presence of the relieved back milled widened portions 38 avoids "hang up" and permits free and easy removal of the cam follower tabs from the slots and the fastener. Once again the beveled or chamfered end portion 40 avoids any interfering surfaces between the fastener and the receptacle as the fastener is withdrawn from the receptacle housing through the open end 46.

The manufacturing procedure for the fastener with the relieved or back milled portion is accomplished in a quick and efficient manner. Each slot is formed and then back milled at its starting end for a predetermined distance such as approximately 30 degrees of the helical turn of the slot. In this manner, manufacturing costs are maintained at a minimum while gaining the advantage of the improved fastener, that is by facilitating assembly of the fastener with the receptacle and disassembly therefrom without danger of "hang up".

An alternative fastener design could employ a single through slot in the end of the shank for coupling with a single cross pin acting as a cam follower in a conventional receptacle. Again a widened zone would be formed at the entrance end of the slot such as by back milling or a similar procedure.

Thus the several aforenoted objects and advantages are most effectively attained. Although several somewhat preferred embodiments have been disclosed and described in detail herein, it should be understood that this invention is in no sense limited thereby and its scope is to be determined by that of the appended claims:

I claim:

1. A fastener comprising an enlarged head portion and a reduced diameter shank portion extending from one end of the head, a cam slot formed in the end of the shank distal from the head portion, the cam slot having a spiral configuration, the end portion of the slot being widened the full width of the slot to facilitate coupling and uncoupling of the fastener with a cam follower introduced to the slot for forming a fastener assembly, the widened end portion of the slot being formed by an arcuate surface at an angle to the radius of curvature of the spiral cam slot directed away from the slot so as to provide a wider opening at the end of the slot than the remainder thereof, the widened end portion being formed by relieving the backside of the cam slot surface at the entrance end portion thereof, and the tip of the shank distal from the head portion being provided with an inward chamfer about its peripheral surface to cooperate with the widened end portion in facilitating coupling of the fastener with a receptacle to form the fastener assembly.

* * * * *